(12) United States Patent
Dvir et al.

(10) Patent No.: US 9,350,559 B2
(45) Date of Patent: May 24, 2016

(54) SERVICE DISCOVERY ACROSS DIFFERENT NETWORKS

(71) Applicant: Asurion, LLC, Nashville, TN (US)

(72) Inventors: Tomer Dvir, Tel-Aviv (IL); Omri Haim, Tel-Aviv (IL); Omri Bruchim, Rishon LeZion (IL); Or Yagel, Herzlia (IL); Jonathan Rauch, Tel Aviv-Yaffo (IL)

(73) Assignee: Asurion, LLC, Nashville, TN (US)

( * ) Notice: Subject to any disclaimer, the term of this patent is extended or adjusted under 35 U.S.C. 154(b) by 0 days.

(21) Appl. No.: 14/305,791

(22) Filed: Jun. 16, 2014

(65) Prior Publication Data

US 2015/0365457 A1    Dec. 17, 2015

(51) Int. Cl.
| | | |
|---|---|---|
| G06F 15/16 | (2006.01) |
| H04L 12/18 | (2006.01) |
| H04L 29/06 | (2006.01) |
| H04L 29/08 | (2006.01) |
| H04L 29/12 | (2006.01) |

(52) U.S. Cl.
CPC ............ *H04L 12/18* (2013.01); *H04L 61/1511* (2013.01); *H04L 61/1541* (2013.01); *H04L 63/0272* (2013.01); *H04L 65/608* (2013.01); *H04L 67/16* (2013.01); *H04L 61/6009* (2013.01)

(58) Field of Classification Search
CPC ............ H04L 12/2818; H04L 12/4641; H04L 29/12113; H04L 45/16; H04L 61/1541; H04L 67/16; H04L 65/608; H04L 12/18; H04L 61/1511; H04L 12/1541; H04L 61/6009; H04L 63/0272
USPC ........................................................ 709/219
See application file for complete search history.

(56) References Cited

U.S. PATENT DOCUMENTS

| | | |
|---|---|---|
| 2004/0102977 A1 | 5/2004 | Metzler et al. |
| 2006/0002320 A1 | 1/2006 | Costa-Requena et al. |
| 2007/0113275 A1 | 5/2007 | Khanna et al. |
| 2008/0263124 A1 | 10/2008 | Song et al. |
| 2013/0094423 A1 | 4/2013 | Wengrovitz et al. |
| 2013/0282793 A1 | 10/2013 | Swings et al. |
| 2014/0012967 A1 | 1/2014 | Agarwal et al. |

OTHER PUBLICATIONS

Debogue, Jean, "How to use Bonjour over VPN," Jan. 3, 2013, http://web.archive.org/web/20130801151348/http://www.wedebugyou.com/2013/01/how-to-use-bonjour-over-vpn, pp. 1-3.

(Continued)

*Primary Examiner* — Christopher Biagini
(74) *Attorney, Agent, or Firm* — Fish & Richardson P.C.

(57) ABSTRACT

Systems and techniques for service discovery and media sharing are described. For example, a described technique includes identifying, at a first device, a streaming service; receiving a request to establish communication with a second device, the first device and the second device being on different first networks, the first networks being different local multicast networks; and providing, in response to the request, service information to the second device to cause the second device to internally publish multicast domain name system (mDNS) information regarding the streaming service such that the streaming service is (i) discoverable by the second device via a mDNS query and (ii) accessible through a second network that interconnects the first networks.

16 Claims, 9 Drawing Sheets

(56) References Cited

OTHER PUBLICATIONS

"mbridge—multicase dns services bridge," archives on Feb. 4, 2009; http://web.archive.org/web/20090204010115/http://strange.nsk.no-ip.org/projects/mbridge/, 1 page.
Cheshire and Krochmal, "RFC 6763: DNS-based Service Discovery," Internet Engineering Task Force (IETF), Feb. 2013, 49 pages.
Cheshire and Krochmal, "RFC 6762: Multicast DNS," Internet Engineering Task Force (IETF), Feb. 2013, 70 pages.
Apple Inc., "Bonjour Overview," Apr. 23, 2013, 39 pages.
Vasseur, "Unofficial AirPlay Protocol Specification," last update Mar. 20, 2012, retrieved on Jun. 11, 2014, 34 pages.
Johns, Heath, "Understanding Zeroconf and Multicast DNS," O'Reilly Wireless DevCenter, Dec. 20, 2002. http://archive.oreilly.com/lpt/a/3046, pp. 1-5.
Authorized officer Gilbert Koestel, International Search Report and Written Opinion in PCT/US2015/034288, mailed Sep. 16, 2015, 12 pages.
"Chapter 25: Cisco Bring Your Own Device (BYOD) CVD Managing Bonjour Services for BYOD," Mar. 6, 2014, pp. 1-25.
Mizukami and Cho, "Tunneling with Service Discovery: A Remote Access Model and Implementation," IEEE Consumer Communications and Networking Conference, 2006, 1(8):223-227.

SERVICE DISCOVERY ACROSS DIFFERENT NETWORKS

FIELD

This patent document generally relates to service discovery in networks.

BACKGROUND

Devices can use a multicast domain name system (mDNS) service to publish and discover services, e.g., printing, media, file sharing, on the same local multicast network. For example, a printer can publish its printing service via mDNS using a multicast data packet; other devices receiving the packet can discover the service and make the printing service available to applications such as a word processor. In another example, a media hub can publish its media service via mDNS; other devices can discover the service and start receiving content from the media hub. Further, wireless devices such as cellphones, smartphones, or tablets can include a mDNS service process to publish or discover services on the same local wireless multicast network.

SUMMARY

This document describes, among other things, technologies relating to service discovery, such as for use for media sharing. In one aspect, a described technique includes receiving, at a first device (e.g., target device, viewee device, etc.), service information for a streaming service provided by a second device (e.g., host device, viewer device, etc.), the first device and second device being on different first networks, the first networks being different local multicast networks; inserting an entry in a mDNS cache of the first device based on the service information such that the streaming service is discoverable by the first device via a mDNS query and accessible through a second network that interconnects the first networks; and sending streaming information from the first device to the second device through the second network for the streaming service. Other forms of this aspect may include corresponding systems, apparatus, and computer software encoded on a non-transitory computer readable storage medium.

These and other implementations may include one or more of the following features. Implementations can include receiving a request to share a display of the first device with the second device. In some implementations, inserting the entry is conditional based on an acceptance of the request. Sending streaming information can include streaming display data associated with a display of the first device. The second device can be configured to reproduce the display of the first device using the display data. Sending streaming information can include streaming audio data. Implementations can include performing the mDNS query based on a service type and a domain, the service type being associated with the streaming service provided by the second device. Sending the information can include using an network address that is returned by the mDNS query. Performing the mDNS query can include searching the mDNS cache, sending an Internet Protocol (IP) multicast packet, or both to discover hosts that provide the service type. Receiving the service information can include receiving, over a unicast connection through the second network, a version of a mDNS service record that was published by the second device on a corresponding one of the first networks. Implementations can include establishing a virtual private network (VPN) tunnel between the first device and the second device over the second network. Sending the information can include transmitting data packets through the VPN tunnel. In some implementations, the service information can include a VPN address of the second device that is associated with the VPN tunnel. The entry can include a name associated with the streaming service and the VPN address of the second device. Establishing the VPN tunnel can include establishing the VPN tunnel with a VPN server using an Internet Protocol security (IPsec) protocol. Other forms of this aspect may include corresponding systems, apparatus, and computer software encoded on a non-transitory computer readable storage medium.

These and other implementations may include one or more of the following features. In another aspect, a technique can include providing, at a first device, a streaming service; receiving a request to establish communication with a second device, the first device and the second device being on different first networks, the first networks being different local multicast networks; and providing, in response to the request, service information to the second device to cause the second device to internally publish mDNS information regarding the streaming service such that the streaming service is discoverable by the second device via a mDNS query and accessible through a second network that interconnects the first networks. Implementations can include receiving a media stream from the second device through the second network; and forwarding the media stream to a third device. Receiving the request can include receiving a request from the third device. Implementations can include establishing a VPN tunnel between the first device and the second device over the second network; and receiving a media stream from the second device through the VPN tunnel. The service information can include a VPN address of the first device that is associated with the VPN tunnel. Establishing the VPN tunnel can include establishing the VPN tunnel with a VPN server using an IPsec protocol.

In another aspect, an apparatus can include a memory configured to store data including a mDNS cache; a network interface configured to exchange data on at least a first network; and a processor coupled with the memory and the network interface. The processor can be configured to receive, over the first network, service information for a streaming service provided by a host device that resides on a second network, the first network and the second network being different local multicast networks, insert an entry in the mDNS cache based on the service information such that the streaming service is discoverable by the apparatus via a mDNS query, and accessible through a third network that interconnects the first network and the second network, and send streaming information to the host device for the streaming service through the third network.

This and other implementations may include one or more of the following features. Implementations can include a display coupled with the processor, where the processor is configured to receive a request to share the display with the host device, and where the entry is inserted in the mDNS cache based on an acceptance of the request. The streaming information can include display data associated with the display, and where the host device is configured to reproduce the display using the display data. The streaming information can include video data, audio data, or both. The processor can be configured to perform the mDNS query based on a service type and a domain, the service type being associated with the streaming service provided by the host device, and send the streaming information based on an network address that is returned by the mDNS query. The mDNS query can include searching the mDNS cache, sending an IP multicast packet, or both to discover hosts that provide the service type. The processor can be configured to establish a VPN tunnel with the host device over the third network, and send the streaming information through the VPN tunnel. The service information can include a VPN address of the host device that is associated with the VPN tunnel. The entry can include a name associated with the streaming service and the VPN address of the host device. In some implementations, the VPN tunnel is configured to use an IPsec protocol.

In another aspect, a system can include a host device configured to provide a streaming service; and a server. The server can be configured to receive a request to establish communication with a target device, the host device and the target device being on different first networks, the first networks being different local multicast networks. The server can be configured to provide, in response to the request, service information to the target device to cause the target device to internally publish mDNS information regarding the streaming service such that the streaming service is discoverable by the target device via a mDNS query and accessible through a second network that interconnects the first networks.

This and other implementations may include one or more of the following features. The host device can be configured to receive a media stream from the target device through the second network, and forward the media stream to a viewer device. The request can be responsive to a request transmitted by the viewer device. The host device can be configured to establish a VPN tunnel with the target device over the second network, and receive a media stream from the target device through the VPN tunnel. In some implementations, the service information includes a VPN address of the host device that is associated with the VPN tunnel. In some implementations, the VPN tunnel is configured to use an IPsec protocol.

Particular configurations of the technology described in this document can be implemented so as to realize none, one, or more of the following potential advantages. A described technology can be used to extend a discovery range of a streaming service beyond a local network. For example, devices on different local multicast networks can discover services on the other network. A discovery range of a streaming service can be extended without modifying a native application that is configured to use the streaming service. For example, a media sharing application can republish service information such that an unmodified streaming service client application can automatically detect the new streaming service and begin using the service.

Details of one or more implementations of the subject matter described in this document are set forth in the accompanying drawings and the description below. Other features, aspects, and potential advantages of the subject matter will become apparent from the description, the drawings, and the claims.

BRIEF DESCRIPTION OF THE DRAWINGS

Like reference symbols in the various drawings indicate like elements.

DETAILED DESCRIPTION

Devices can employ one or more service discovery routines to rapidly find and use services provided by other devices. Various examples of protocols for service discovery include DNS-Based Service Discovery (DNS-SD) and multicast DNS (mDNS). One particular protocol implementation is Bonjour. Bonjour has features including service discovery, hostname resolution, and address assignment. However, some service discovery protocols use multicast data packets and may be limited to a local multicast network. Thus, devices on different local multicast networks may not be able to discover each other because their multicast data packets may not be routed beyond their respective local multicast networks.

Figure 1:
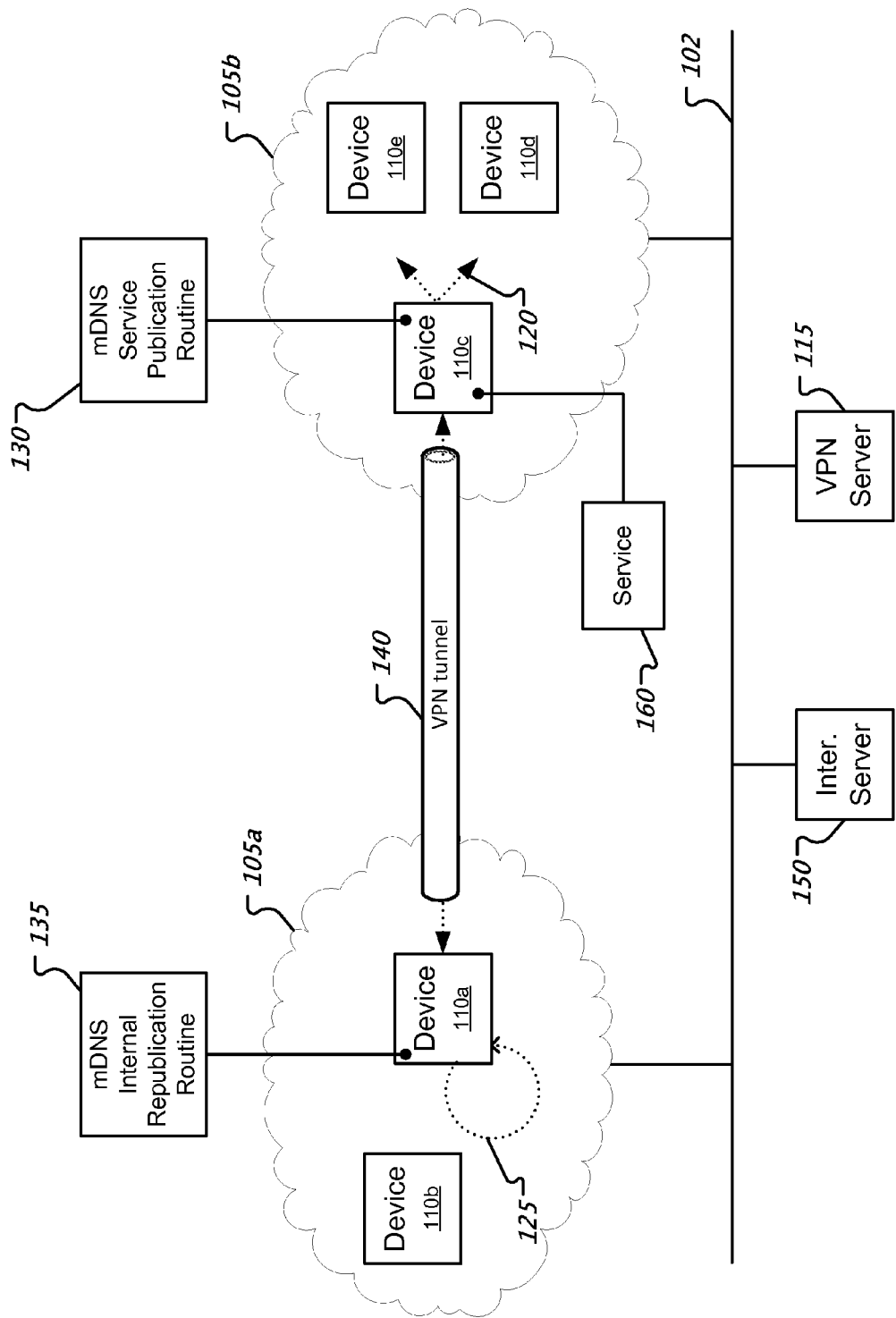
FIG. 1 shows an example of a multi-network service sharing architecture.

FIG. 1 shows an example of a multi-network service sharing architecture. A public network 102 such as the Internet can connect separate local networks 105*a-b* such that devices 110*a-e* can communicate between the local networks 105*a-b* in addition to within their respective local networks 105*a-b*. Further, one or more devices 110*a-e* can provide other devices with a service such as media streaming, printing, or file storage. Devices providing services can publish information on a local network to inform other devices on the local network of the provided services in such a fashion that requires minimal or zero configuration. In this example, device 110*c* includes a mDNS service publication routine 130 that is configured to send a multicast IP packet 120 on its local network 105*b* to publish an availability of a service 160. Other devices 110*e-d* on the local network 105*b* discover the service 160 based on receiving the multicast IP packet 120. In some mDNS protocols, the multicast IP packet 120 is restricted to its local network 105*b* by setting, within the packet 120, a time to live (TTL) field to one, thereby causing the packet 120 not to be routed outside of the local network 105*b*. For the purposes of local multicast communications such as those associated with a TTL of one, a local network can be referred to as a local multicast network.

As a result of limiting mDNS service publication to a local network 105*b*, devices 110*a-b* on a different local network 105*a* will not receive the multicast IP packet 120, and accordingly, will not discover the service 160 being provided by device 110*c*. Moreover, the local networks 105*a-b* may be using private IP addresses that are not by themselves routable on the Internet. For example, both local networks 105*a-b* may be using the private IP address space of 192.168.0.0/16, or both may be using the 169.254.0.0/16 for link-local addressing. As a result, the network address contained in the multicast IP packet 120 for reaching the service 160 would be a private address that is not routable on the public network 102.

To solve this problem, service information contained in the multicast IP packet 120 can be forwarded to a device 110*a* on a different local network 105*a*. In some implementations, an intermediary server 150 can perform such forwarding. In some implementations, the intermediary server 150 can provide a medium (e.g., a website) that enables devices 110*a-e* to discover each other and one or more associated services. For example, device 110*c* can inform the intermediary server 150 that it is providing the service 160, e.g., send information including a service identification string and a network address/port to reach the corresponding service 160 via a network pathway on the public network 102 such as a VPN tunnel 140. To create a network pathway between device 110*c* and device 110*a*, a VPN tunnel 140, for example, can be formed between these devices. In some implementations, device 110*c* and device 110*a* independently establish connections with the VPN server 115, and are assigned respective VPN addresses. Thereafter, data packets addressed with a VPN address can flow between the devices 110*c*, 110*a* via the VPN server 115. The service information provided to the device 110*a* on a different local network 105*a* can include a VPN address of the device 110*c* providing the service 160 such that the device 110*a* would use the VPN address to access the service 160.

Upon receiving the forwarded service information from the intermediary server 150, device 110*a* can process the forwarded service information by using a mDNS internal republication routine 135. The republication routine 135 can internally publish 125 the service information by inserting a record for the service 160 in a local mDNS cache of device 110*a*. In some implementations, internally publishing mDNS information can include inserting a service record into the local mDNS cache without transmitting or receiving a mDNS multicast packet. Applications executing on device 110*a* can discover the service 160 when they trigger a DNS query, e.g., a mDNS query, using a name associated with the service 160 such as a service identifier string. A response to the DNS query can include information based on one or more records matching, in whole or in part, a service identifier string contained within the DNS query.

Figure 2:
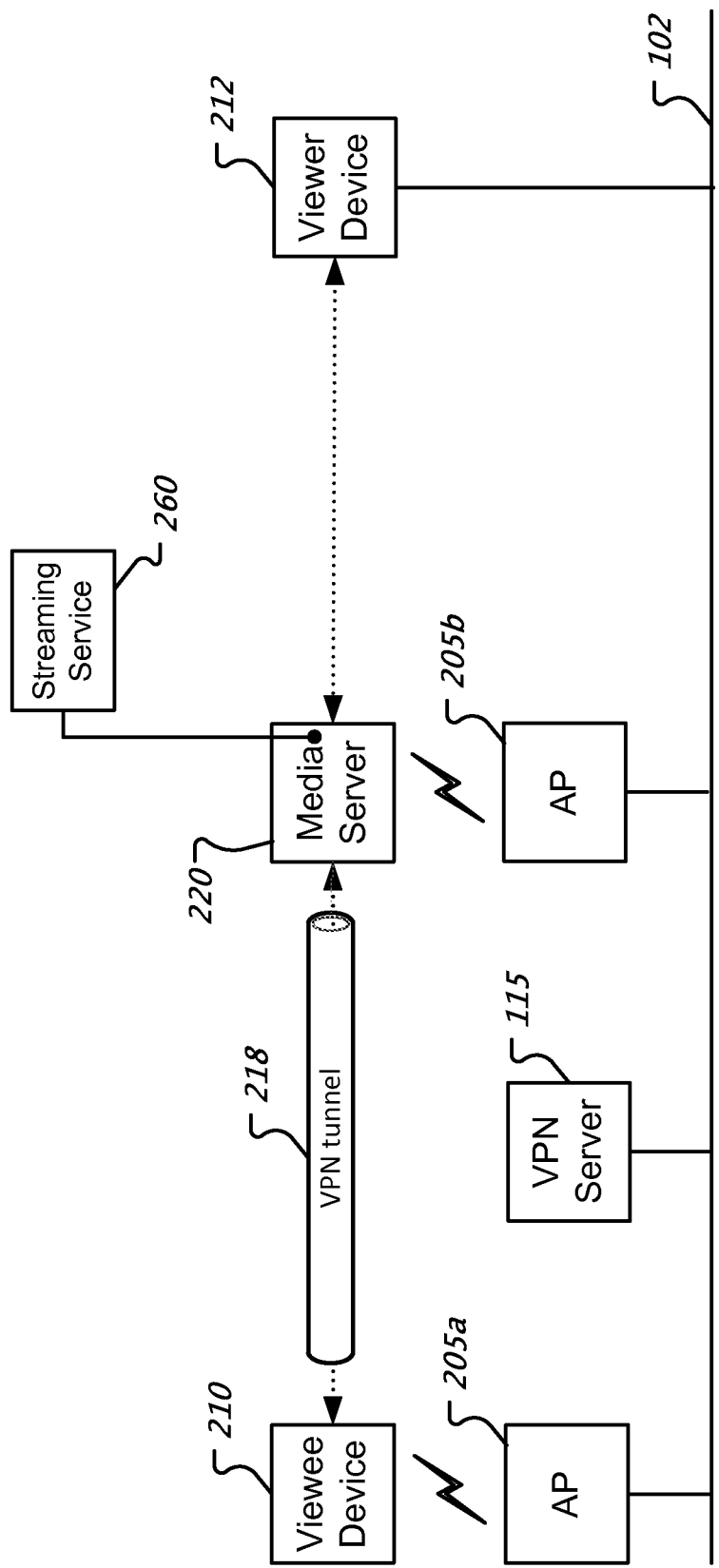
FIG. 2 shows an example of a streaming service architecture.

FIG. 2 shows an example of a streaming service architecture. Multiple devices, including a "viewee" device 210, media server 220, VPN server 115, and "viewer" device 212, can participate to stream media. For example, media server 220 can provide a streaming service 260 that enables the viewee device 210 to mirror its display to the media server 220, which in turns provides corresponding display data to viewer device 212. Note that device 212 is labelled as a viewer because, in this example, device 212 views the mirroring display output of device 210, which is labelled as a viewee. While not depicted, the viewee device 210, media server 220, and viewer device 212 can reside on different local multicast networks.

A wireless access point (AP) 205*a* can provide wireless connectivity between the viewee device 210 and the public network 102. Another wireless AP 205*b* can provide wireless connectivity between the media server 220 and the public network 102. The viewee device 210 can communicate with the media server 220 through a VPN tunnel 218. A VPN server 115 can be configured to provide the VPN tunnel 218. In some implementations, the VPN server 115 is configured to secure the VPN tunnel 218 by using an Internet Protocol security (IPsec) protocol. In some implementations, the VPN server 115 is configured to use a Point-to-Point Tunneling Protocol (PPTP).

The viewer device 212 can send a request to the media server 220 for establishing a remote viewing session with the viewee device 210. In turn, the media server 220 can cause the viewee device 210 to internally publish the streaming service 260 provided by the media server 220, for example, by sending service information for the service 260 to an application running on the viewee device 210 that is configured to perform an internal publication. Based on a user approval at the viewee device 210 and discovery of the streaming service 260 after internal publication, a media stream can be streamed from the viewee device 210 to the media server 220, which can provide the media stream to the viewer device 212. In some implementations, the viewee device 210 uses a first protocol, such as Apple's AirPlay protocol, to stream display data to the media server 220, and the media server 220 uses a second protocol, such as a Hypertext Transfer Protocol (HTTP) based streaming protocol, to stream the received display data to the viewer device 212 via a website. As depicted by FIG. 2, the media server 220 and the viewer device 212 are different devices. However, in some implementations, the media server 220 and the viewer device 212 are the same device.

In some implementations, the viewee device 210 and media server 220 can use Bonjour from Apple. Bonjour includes mechanisms for publishing, discovering, and using IP-based services. Bonjour supports three fundamental operations, each of which is a part of zero-configuration network services: Publication (e.g., advertising a service), Discovery (e.g., browsing for available services), and Resolution (e.g., translating service instance names to addresses and port numbers for use). Apple's AirPlay protocol uses Bonjour. For example, the media server 220 can advertise its streaming service, e.g., an AirPlay media service, on a local network associated with AP 205*b* using Bonjour. Note that such advertising on the local network can use a private, non-routable IP address of the media server 220 for a local network provided by AP 205*b*.

Typically, AirPlay publishes two services to the local network to inform others on the network that there is an available destination where wireless devices, such as mobile phones based on the iOS operating system, are available for screen sharing. These services have names and associated port numbers, for example "_airplay._tcp." and port 7000 are for video streaming, and "_raop._tcp" and port 47000 are for sound streaming. However, Bonjour local service discovery is based on "multicast DNS" and therefor can be limited to the local network. Since the viewee device 210 is on a different local network, the media server 220 can directly send service information, which includes AirPlay's service names and port numbers, to the viewee device 210. Rather than receiving a mDNS multicast packet from the media server 220, the service information can be sent over a unicast connection via public network 102, and an application on the viewee device 210 can directly insert the unicasted service information into a mDNS data structure, such as a cache. For example, the viewee device 210 can use an application programming interface (API) provided by a C library called DNS-SD for publishing and discovering DNS services on a local network. Based on receiving the service information over a unit connection, the viewee device 210 can use the DNS-SD library to internally publish two AirPlay bonjour (DNS) services: "airplay._tcp" and "_raop._tcp" which can cause entries to be inserted into a mDNS cache that are based on the received service information. In the example of FIG. 2, the IP address included the inserted entries for the media server 220 will be one that is reachable by the viewee device 210, i.e., the IP address of the destination is the IP address of the media server 220 provided by the VPN tunnel 218 and not, for example, a private, non-routable IP address of the media server 220 for a local wireless network provided by AP 205*b*.

Figure 3:
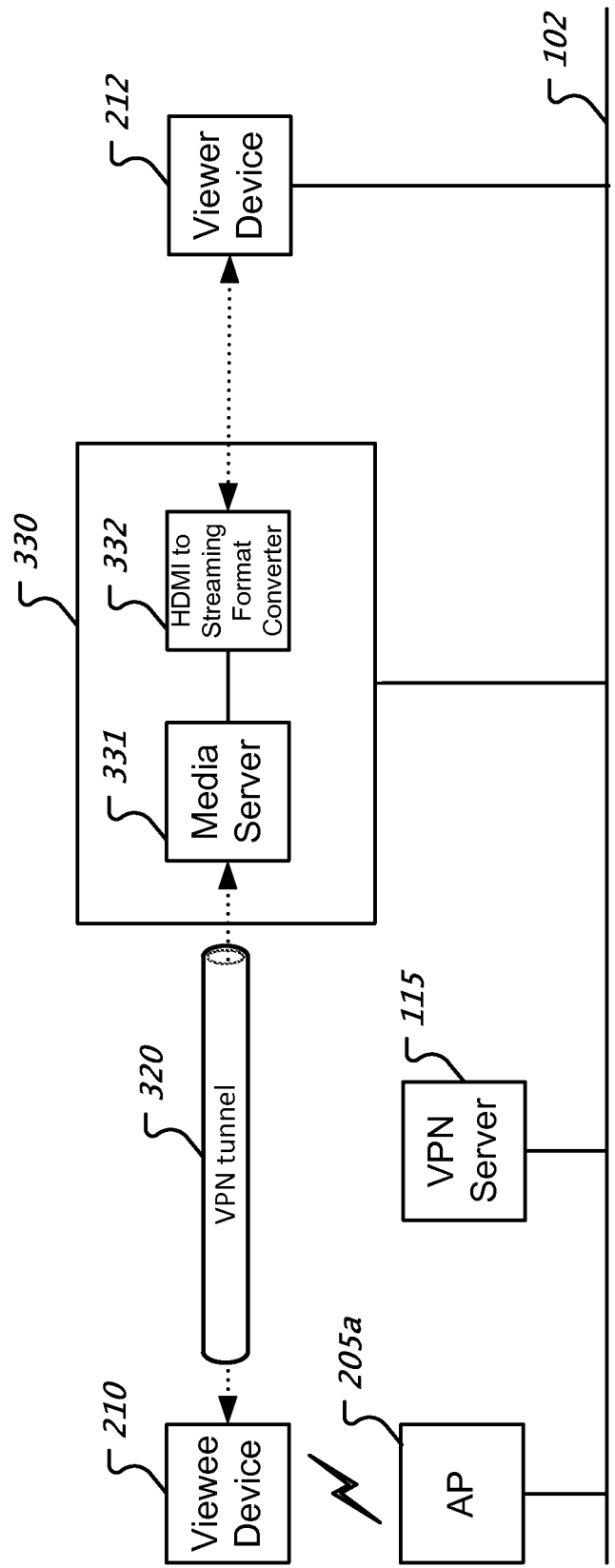
FIG. 3 shows another example of a streaming service architecture.

FIG. 3 shows another example of a streaming service architecture. A media server system 330 can be used to stream media between a viewee device 210 and a viewer device 212. The media server system 330 can provide a streaming service that enables the viewee device 210 to mirror its display to the media server system 330, which in turns provides a copy of the display to viewer device 212. While not depicted, the viewee device 210, media server system 330, and viewer device 212 can reside on different local multicast networks. AP 205a can provide wireless connectivity between the viewee device 210 and the public network 102. The viewee device 210 can communicate with the media server system 330 through a VPN tunnel 320. A VPN server 115 can be configured to provide the VPN tunnel 320. Viewer device 212 can send a request to the media server system 330 for establishing a remote viewing session with the viewee device 210. The media server system 330 can include a media server 331 and a converter 332. In some implementations, the media server 331 is connected to the converter 332 via a High-Definition Multimedia Interface (HDMI) cable, and the converter 332 is configured to convert HDMI input into a streaming format output. In some implementations, the media server system 330 includes the VPN server 115. In some implementations, the media server system 330 can include a web server providing a website for requesting a remote viewing session with a target device such as the viewee device 210. In some implementations, the media server system 330 can include a web server providing a website for viewing the streaming output of the converter 332.

Figure 4:
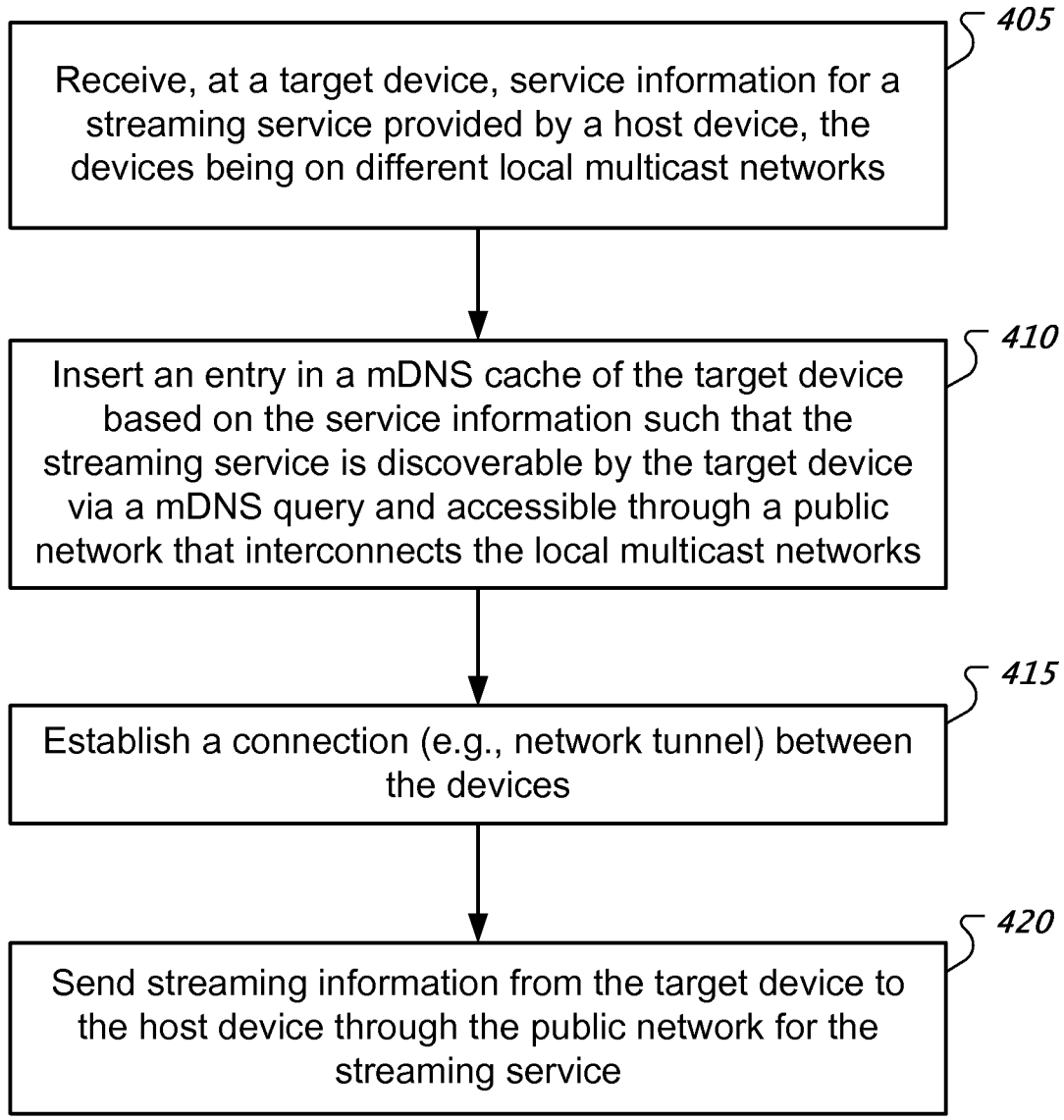
FIG. 4 shows a flowchart for an example of a service sharing client process.

FIG. 4 shows a flowchart for an example of a service sharing client process. The service sharing client process can be implemented by a device such as computer or a wireless communication device. Various examples of a wireless communication device include a smartphone, wireless tablet, or wireless laptop. At 405, service information is received, at a target device, the service information for a streaming service provided by a host device, the devices being on different local multicast networks. In some implementations, a host device includes a media server. At 410, an entry is inserted in a mDNS cache of the target device based on the service information such that the streaming service is discoverable by the target device via a mDNS query and accessible through a public network, such as the Internet, that interconnects the local multicast networks. At 415, a connection is established, such as a network tunnel, between the devices. In some implementations, the network tunnel is a VPN tunnel. The entry inserted into the mDNS cache can include a VPN address of the host device. At 420, streaming information is sent from the target device to the host device through the public network for the streaming service. In some implementations, streaming information can include data for screen mirroring. In some implementations, streaming information can include video data, audio data, or both.

Figure 5:
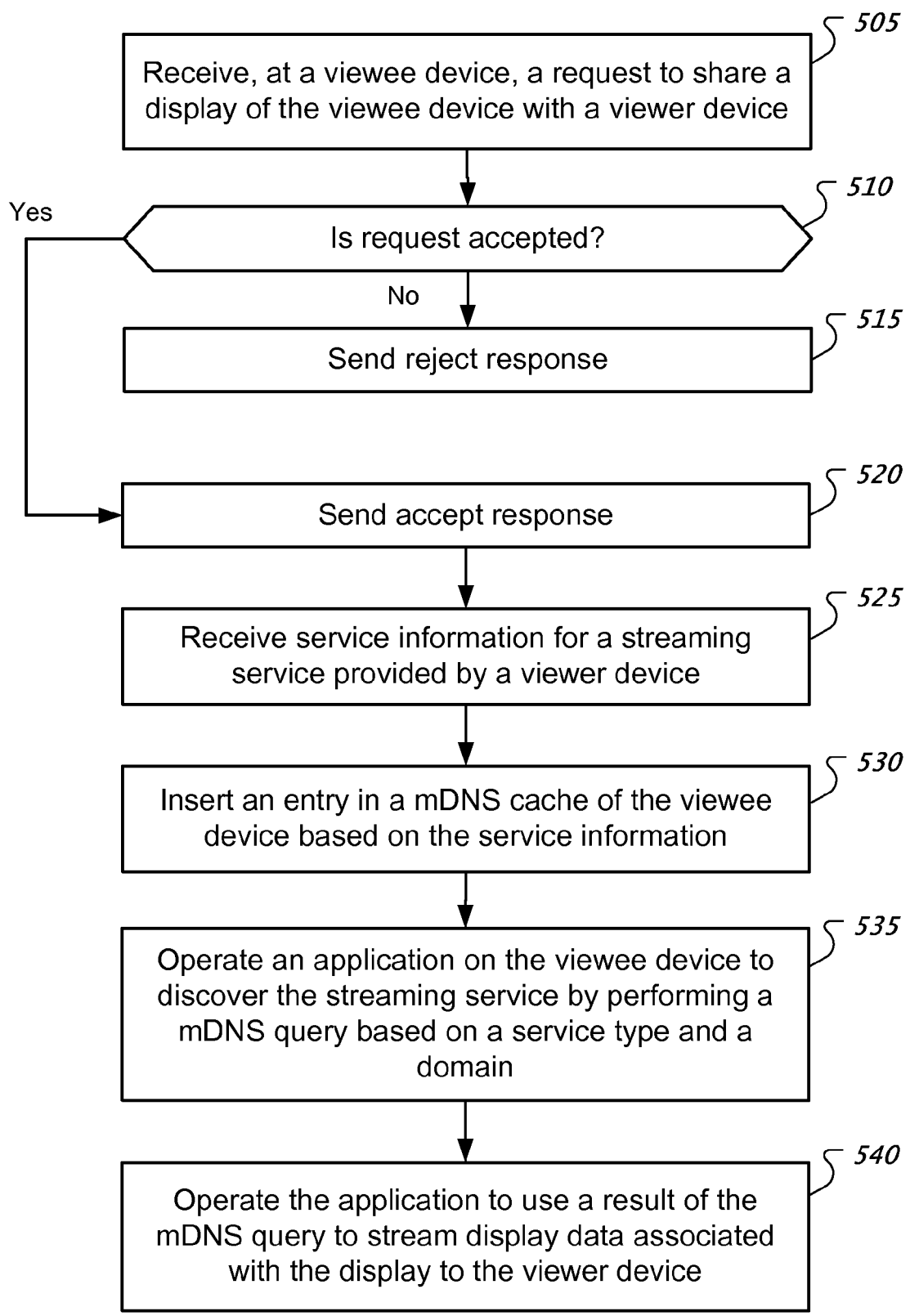
FIG. 5 shows a flowchart for another example of a service sharing client process.

FIG. 5 shows a flowchart for another example of a service sharing client process. The service sharing client process can be implemented by a device such as computer or a wireless communication device. At 505, a request is received, at a viewee device, to share a display of the viewee device with a viewer device. The request can include an identifier associated with the viewer device such as a device name or a user name. The request can include a request type field that indicates a share display request. If the request is not accepted at 510, a reject response is sent to the viewer device at 515.

If the request is accepted at 510, an accept response is sent to the viewer device at 520. At 525, service information is received for a streaming service provided by a viewer device. The viewee device and viewer device are on different local multicast networks. In some implementations, receiving the request is combined with receiving the service information, e.g., the request includes the service information. In some implementations, the viewer device sends the service information based on receiving the accept response. Service information can include a service type value, domain name, network address such as an IP address, and one or more service parameters associated with the service type value. Various examples of service parameters can include a device identifier, session identifier, server version, encryption key, encryption initialization vector, latency value, or timestamp. Other types of service parameters are possible.

At 530, an entry is inserted in a mDNS cache of the viewee device based on the service information. Inserting an entry in a mDNS cache can include calling a routine of a mDNS library using one or more data elements of the service information such as a domain name, service type, network port value, and a network address. The mDNS routine can cause an entry to be created and inserted into the viewee device's mDNS cache.

At 535, an application on the viewee device is invoked to discover the streaming service including performing a mDNS query based on a service type and a domain name. In some implementations, the application is a display sharing application such as a client that is complaint with Apple's Airplay protocol. In some implementations, the application uses predetermined values for the service type and the domain name for the mDNS query. In some implementations, performing the mDNS query can include searching the mDNS cache, sending a multicast packet on a local network, or both to discover hosts that provide the service type. In some cases, the mDNS query can return multiple providers of the service type. In such cases, the viewee device can select one of the providers before proceeding. Selecting a provider can include prompting for and receiving user input.

At 540, a result of the mDNS query is used to stream display data associated with the display to the viewer device. The result of the mDNS query can include a network address, such as an IP address, associated with the viewer device. using the result at 540, can include establishing a TCP connection with the viewer's IP address, placing display data and/or audio data into data packets, and sending the data packets over the TCP connection. In some implementations, an application can transmit an H.264 encoded video stream over a TCP connection. In some implementations, the video stream is packetized with a 128-byte header. In some implementations, the video stream includes an associated Advanced Audio Coding (AAC) audio stream such as one based on AAC-ELD. The audio stream can be transmitted in accordance with the AirTunes protocol. In some implementations, a master clock associated with the streams can be synchronized using a Network Time Protocol (NTP).

Figure 6:
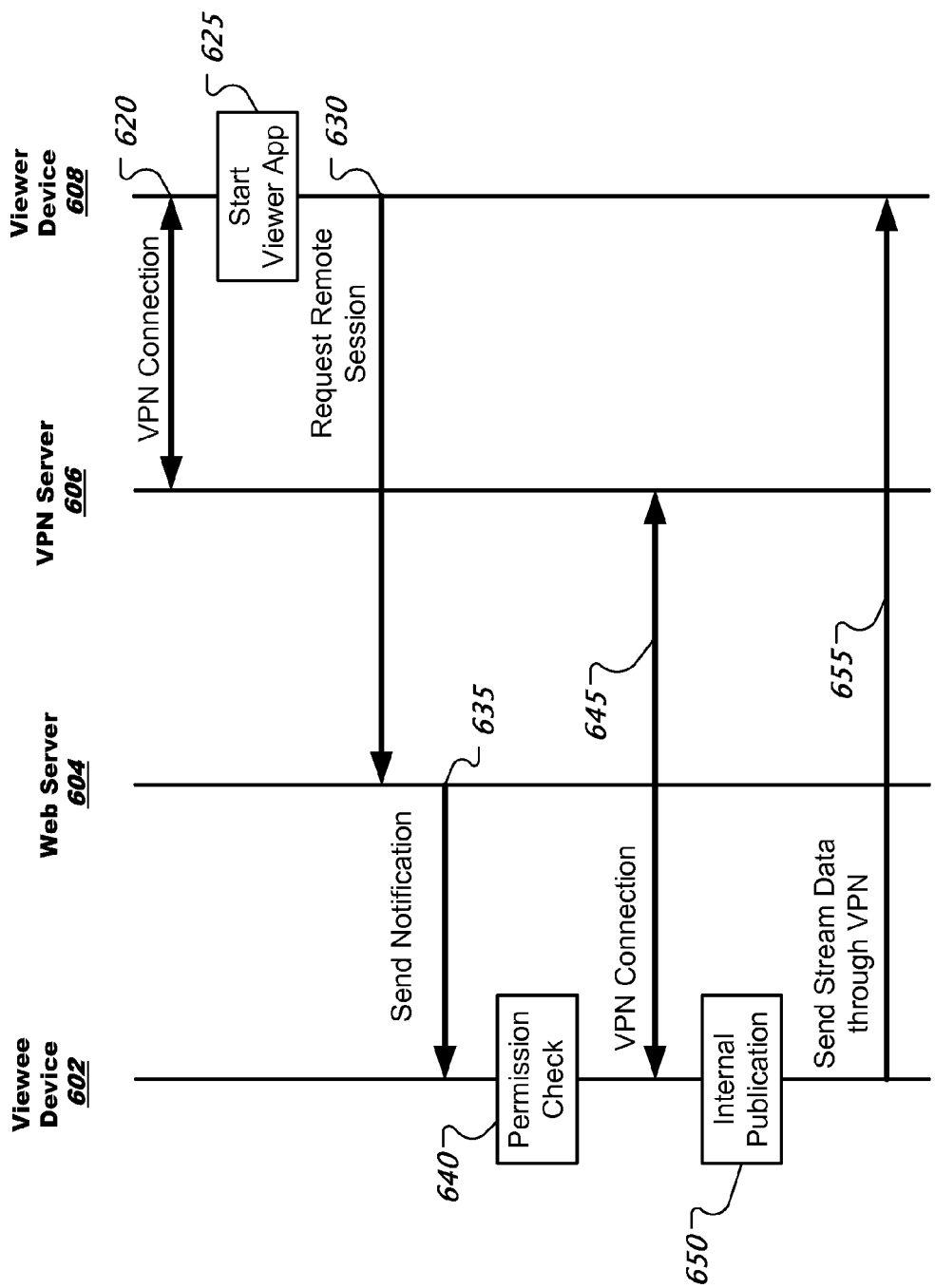
FIG. 6 shows a timing diagram for an example of a service sharing process.

FIG. 6 shows a timing diagram for an example of a service sharing process. The process includes communications among a viewee device 602, web server 604, VPN server 606, and a viewer device 608. At 620, the viewer device 608 establishes a VPN connection with the VPN server 606. At 625, the viewer device 608 starts a viewer application. At 630, the viewer device 608 sends a remote session request to the web server 604. In some implementations, the web server 604 provides a list of one or more devices for viewing, and the remote session request is generated based on selecting (e.g., clicking on) a device within the list. In some implementations, the remote session request includes a viewee identifier, e.g., user name, associated with the viewee device 602.

At 635, the web server 604 sends a notification to viewee device 602 in response to the remote session request. In some implementations, the notification is a push notification. In some implementations, the notification includes a VPN address of the viewer device 608. In some implementations, the notification includes service information that contains a service name corresponding to a streaming service provided by the viewer device 608, a VPN address of the viewer device 608, and a port number of a port listening for incoming streaming service communications.

At 640, the viewee device 602 performs a permission check in response to receiving the notification. In some implementations, the permission check includes displaying a message on a display of the viewee device 602 asking for permission to share the display of the viewee device 602 with the viewer device 608. In some implementations, receiving the notification causes a media sharing application to be launch that handles the permission check. In some implementations, the media sharing application can require a user login or registration with a media sharing website which can be provided by web server 604. At 645, the viewee device 602 establishes a VPN connection with the VPN server 606 based on a successful permission check. In some implementations, the media sharing application uses a predetermined network address to reach the VPN server 606.

At 650, the viewee device 602 performs an internal publication based on a successful permission check. In some implementations, the media sharing application performs the internal publication by using an API to access a mDNS process running on the viewee device 602. Performing the internal publication can include using a mDNS based API to insert an entry (e.g., service record) into a local mDNS cache. In some implementations, the service record is for a streaming service based on service information contained in the notification. Once inserted, the mDNS process can inform interested processes about the new record. For example, a client, on the viewee device 602, that is associated with the steaming service can be launched to access the service. The client can retrieve one or more service records matching a service identifier associated with the streaming service. Upon retrieving, the client can discover the streaming service provided by the viewer device 608. If there are multiple matching records, the client can display a dialog box on a display of the viewee device 602 to receive a user-based input as to which viewer device to select. In the example shown, viewer device 608 can be selected by the user. At 655, the viewee device 602 sends stream data through the VPN tunnel to the viewer device 608. In some implementations, the client associated with the steaming service sends the stream data.

Figure 7:
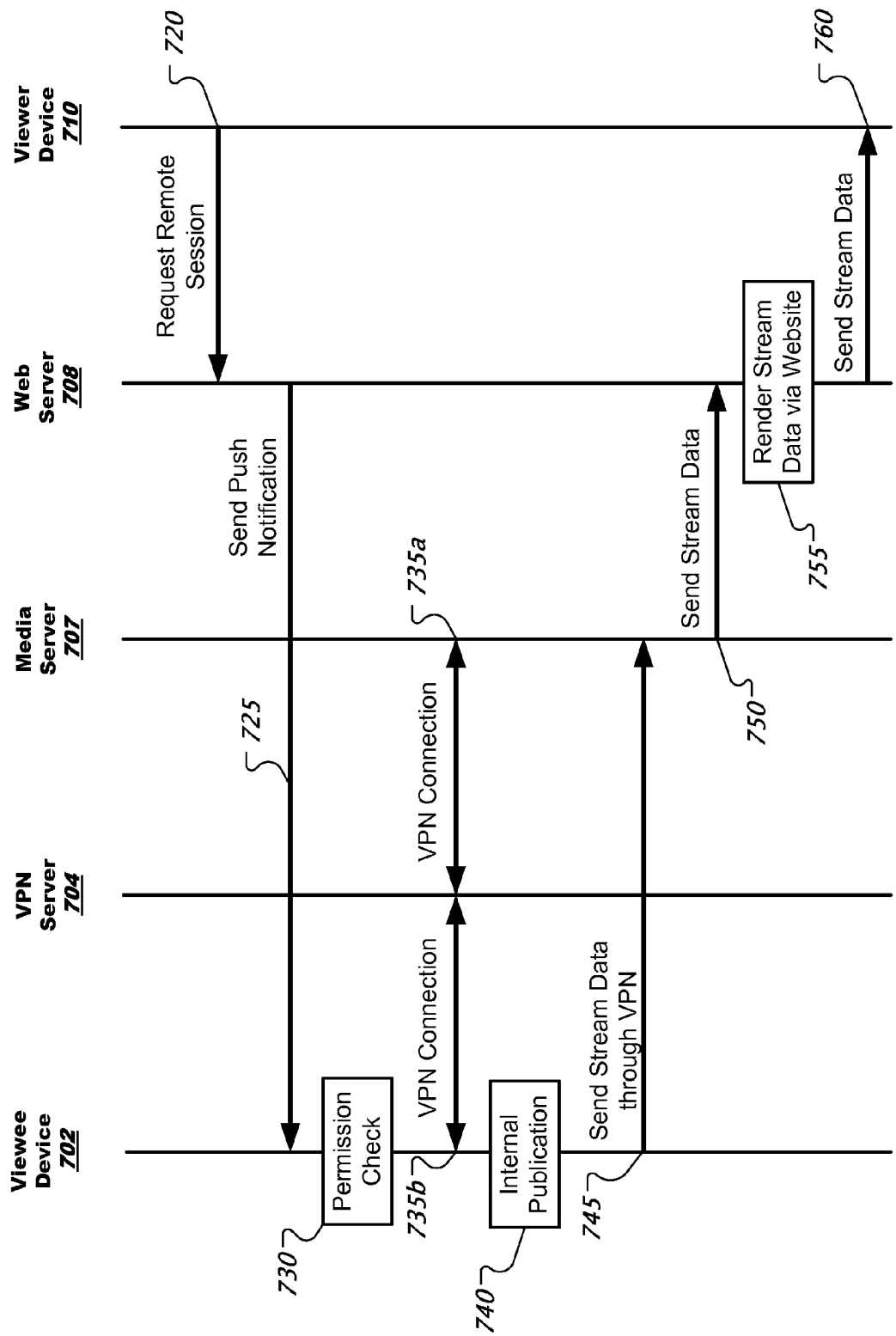
FIG. 7 shows a timing diagram for another example of a service sharing process.

FIG. 7 shows a timing diagram for another example of a service sharing process. The process includes communications among a viewee device 702, VPN server 704, media server 707, web server 708, and a viewer device 710. At 720, the viewer device 710 sends a remote session request to the web server 708. In some implementations, the viewer device 710 is logged into a website that enables media sharing across different local networks. In some implementations, the remote session request includes a viewee identifier corresponding to the viewee device 702.

At 725, the web server 604 sends a notification (e.g., a push notification) to the viewee device 702. In some implementations, the web server 604 retrieves a network address in a database that corresponds to the viewee identifier, and sends the push notification to the retrieved network address. The push notification can include service information to enable the viewee device 702 to use a streaming service provided by the media server 707. In some implementations, the push notification includes a viewer identifier corresponding to the viewer device 710. In some implementations, the push notification includes service information containing a VPN address of the media server 707.

At 730, the viewee device 702 performs a permission check in response to receiving the notification. In some implementations, the permission check includes displaying a message on a display of the viewee device 602 asking for permission to share the display of the viewee device 602. In some implementations, the viewee device 702 can send a status response to the web server 708 to indicate that the notification is accepted, rejected, or ignored. In some implementations, the web server 708 can forward the status response to the media server 707.

At 735*a*, the media server 707 establishes a VPN connection with the VPN server 704. In some implementations, the media server 707 establishes a VPN connection in response to an acceptant of the push notification. At 735*b*, the viewee device 702 establishes a VPN connection with the VPN server 704 in response to accepting the notification. At 740, the viewee device 702 performs an internal publication based on the service information contained within the notification. At 745, the viewee device 702 sends stream data through the VPN tunnel to the media server 707. At 750, the media server 707 sends the stream data to the web server 708. At 755, the web server 708 renders the stream data via a website. At 760, the viewer device 710 receives the stream data via the website. In some implementations, the media server 707 outputs (e.g., to a converter) an HDMI signal corresponding to the stream data. The converter can be configured to transform the HDMI signal into a web-based streaming format such that the viewer device 710 can view the web-based stream via the website.

Figure 8:
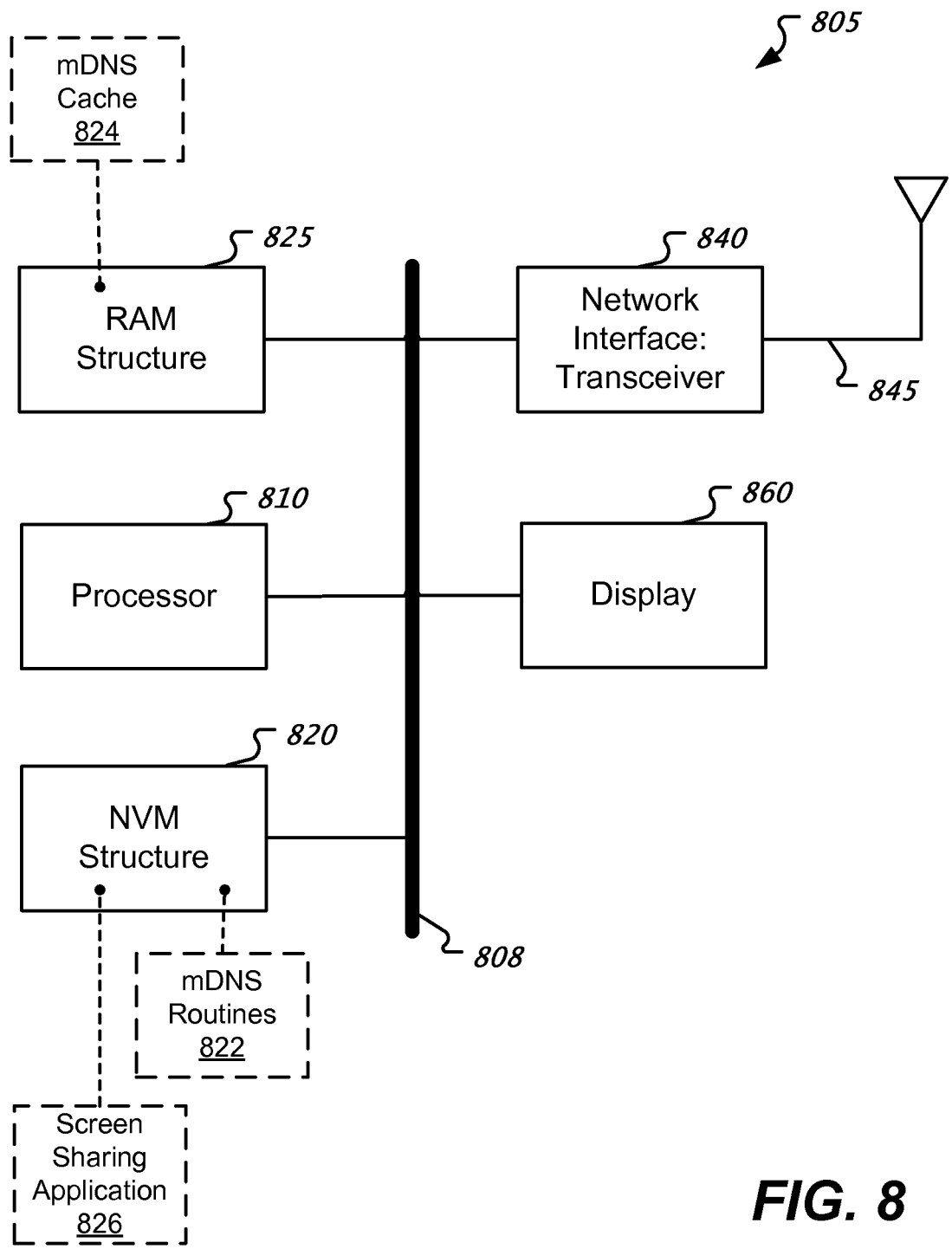
FIG. 8 shows a simplified architecture of an example of a wireless communication device that is configured to internally publish service information.

FIG. 8 shows a simplified architecture of an example of a wireless communication device 805 that is configured to internally publish service information. The wireless communication device 805 includes a processor 810, non-volatile memory (NVM) structure 820, random-access memory (RAM) structure 825, display 860, network interface such as a transceiver 840, and antenna 845. The device 805 can include other components not shown such as a keyboard, camera, and motion sensors. A bus 808 can interconnect components within the wireless communication device 805.

The wireless communication device 805 can send and receive data packets over one or more wireless interfaces. For example, the processor 810 can send and receive data packets via one or more transceivers 840 and antennas 845. Various examples of wireless interface technology include interfaces based on Long Term Evolution (LTE), Global System for Mobile Communications (GSM), IEEE 802.11a/b/g/n/ac, and Code Division Multiple Access (CDMA) technologies such as CDMA2000 and WCDMA. Other types of wireless interface technologies are possible. The wireless communication device 805 can download application software over one or more of these wireless interfaces and store the application software on a memory structure such as the NVM structure 820 or the RAM structure 825. In some implementations, the one or more transceivers 840 are configured to use multicast over an IEEE 802.11 wireless standard to wirelessly transmit or receive multicast packets.

The NVM structure 820 stores software such as a wireless device OS and application software such as a screen sharing application 826 and mDNS routines 822 that are accessible by a mDNS API. In some implementations, the mDNS routines 822 can read and write to a mDNS cache 824 that is stored in the RAM structure 825. The processor 810 can load software from the NVM structure 820 into the RAM structure 825, and can start to execute the software from the RAM structure 825. In some implementations, the processor 810 directly executes software from the NVM structure 820. In some implementations, the processor 810 includes multiple processor cores.

Figure 9:
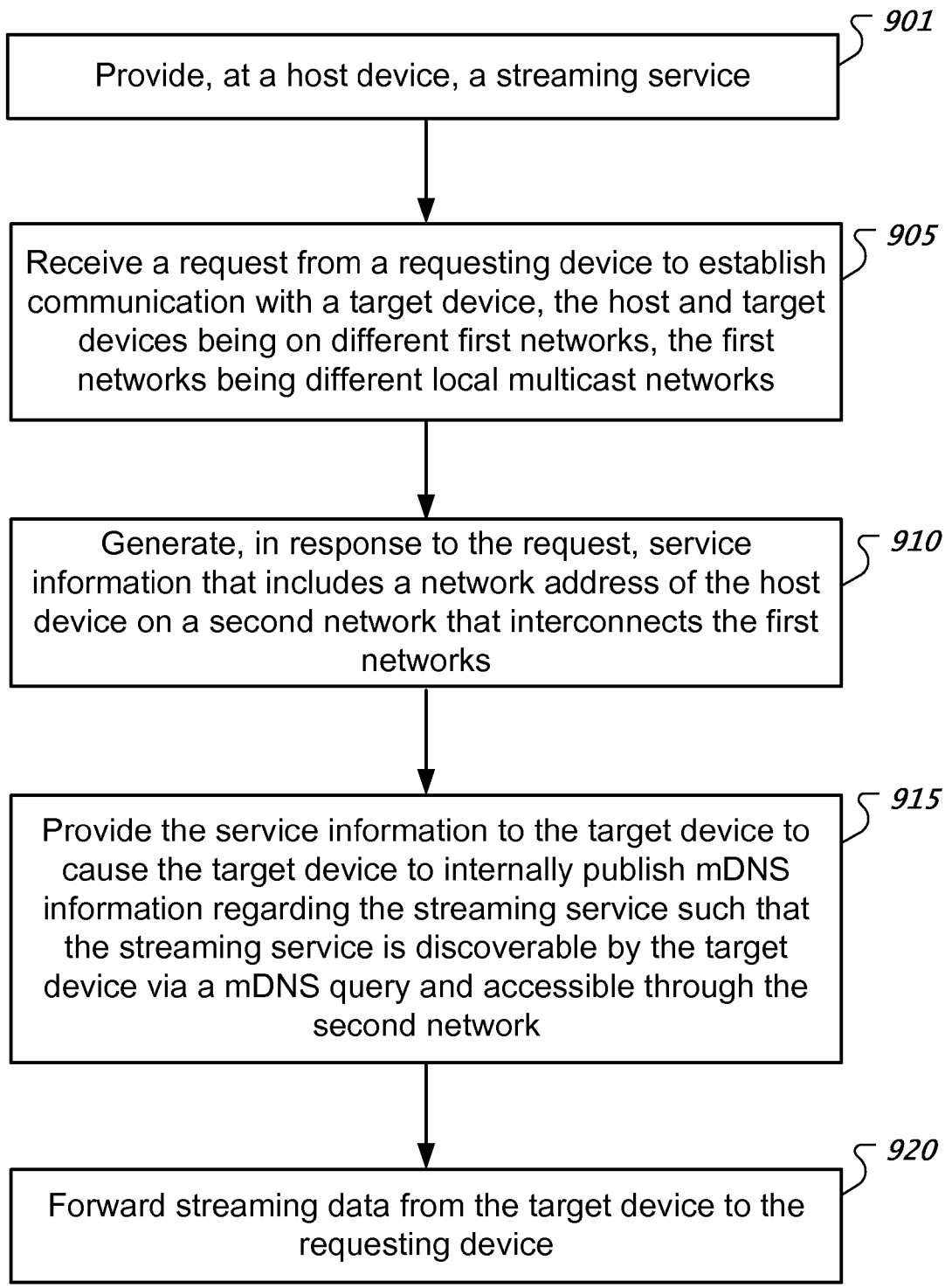
FIG. 9 shows a flowchart for an example of a service sharing server process.

FIG. 9 shows a flowchart for an example of a service sharing server process. The service sharing server process can be implemented by a device such as a web server, media server, or a combination thereof. Other implementations are possible. At 901, a streaming service is provided, at a host device. At 905, a request is received from a requesting device to establish communication with a target device. In this example, the host and target devices are on different first networks, the first networks being different local multicast networks. The request can include a request to share the display of the target device with the requesting device. In some implementations, at 905, the request is received via a website.

At 910, and in response to the request, service information is generated that includes a network address of the target device on a second network that interconnects the first networks. The service information can include a service name and a network port value. At 915, the service information is provided to the target device to cause the target device to internally publish mDNS information regarding the streaming service such that the streaming service is discoverable by the target device via a mDNS query and accessible through the second network. At 920, streaming data is forwarded from the target device to the requesting device. In some implementations, the streaming data is received through a VPN tunnel from the target device, and transmitted to the requesting device. Transmitting the streaming data to the requesting device can include streaming data through a web browser using a Transport Layer Security (TLS) or a Secure Sockets Layer (SSL) protocol. In some implementations, both the requesting device and the target device log in to a service sharing website that is configured to exchange service sharing requests. In some implementations, the requesting device is the host device. In some implementations, the requesting device and the host device are separate devices.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for detecting impersonation on a social network may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method comprising:
   identifying, at a host device, a streaming service;
   receiving, at the host device, a request from a viewer device to view information provided by a target device, the host device and the target device being on different first networks, the first networks being different local multicast networks;
   providing, in response to the request, service information to the target device to cause the target device to internally publish multicast domain name system (mDNS) information regarding the streaming service such that the streaming service is (i) discoverable by the target device via a mDNS query and (ii) accessible through a second network that interconnects the first networks;
   receiving, at the host device, a media stream from the target device through the second network; and
   forwarding the media stream to the viewer device.

2. The method of claim 1, wherein receiving the request comprises receiving a request to view a display of the target device.

3. The method of claim 1, wherein the media stream comprises video data, audio data, or both.

4. The method of claim 1, wherein forwarding the media stream comprises sending a converted version of the media stream.

5. The method of claim 1, wherein the host device comprises a media server and a format converter.

6. The method of claim 1, comprising:
establishing a virtual private network (VPN) tunnel between the host device and the target device over the second network, wherein receiving the media stream comprises receiving the media stream through the VPN tunnel.

7. The method of claim 6, wherein the service information comprises a VPN address of the host device that is associated with the VPN tunnel.

8. The method of claim 6, wherein establishing the VPN tunnel comprises establishing the VPN tunnel with a VPN server using an Internet Protocol security (IPsec) protocol.

9. A system comprising:
a host device configured to provide a streaming service; and
a server configured to (i) receive a request from a viewer device to view information provided by a target device, the host device and the target device being on different first networks, the first networks being different local multicast networks, and (ii) provide, in response to the request, service information to the target device to cause the target device to internally publish multicast domain name system (mDNS) information regarding the streaming service such that the streaming service is discoverable by the target device via a mDNS query and accessible through a second network that interconnects the first networks,
wherein the host device is configured to (i) receive a media stream from the target device through the second network, and (ii) forward the media stream to the viewer device.

10. The system of claim 9, wherein the request comprises a request to view a display of the target device.

11. The system of claim 9, wherein the media stream comprises video data, audio data, or both.

12. The system of claim 9, comprises:
a converter to convert the media stream into a converted media stream, wherein the converted media stream is forwarded to the viewer device.

13. The system of claim 9, wherein the host device is configured to establish a virtual private network (VPN) tunnel with the target device over the second network, and wherein the media stream is received from the target device through the VPN tunnel.

14. The system of claim 13, wherein the service information comprises a VPN address of the host device that is associated with the VPN tunnel.

15. The system of claim 13, wherein the VPN tunnel is configured to use an Internet Protocol security (IPsec) protocol.

16. The system of claim 9, wherein the host device comprises the server.

* * * * *